United States Patent

Kaplan

[11] 3,846,569
[45] Nov. 5, 1974

[54] METHOD OF MAKING A DISPOSABLE PRECHARGED COFFEE BAG

[76] Inventor: Reuben A. Kaplan, c/o Owatanna Tool Company, Owatonna, Minn. 55060

[22] Filed: Oct. 6, 1972

[21] Appl. No.: 295,473

Related U.S. Application Data

[63] Continuation of Ser. No. 114,149, Feb. 10, 1971, abandoned, which is a continuation of Ser. No. 881,053, Dec. 1, 1969, abandoned.

[52] U.S. Cl. ..................... 426/394, 53/28, 53/39, 426/77
[51] Int. Cl. ............................................. B65b 29/02
[58] Field of Search ............ 99/77.1, 171 R, 171 P, 99/171 CP, 295; 53/28, 39; 206/.5, 56 A; 426/77, 115, 193, 394, 410

[56] References Cited
UNITED STATES PATENTS

| | | | |
|---|---|---|---|
| 2,160,367 | 5/1939 | Maxfield | 99/171 CP |
| 2,791,505 | 5/1957 | Barnett | 99/77.1 |
| 3,164,935 | 1/1965 | Stroop | 53/28 X |
| 3,373,677 | 3/1968 | Petrozzo | 99/77.1 X |
| 3,420,675 | 1/1969 | Costas | 99/77.1 |
| 3,589,913 | 6/1971 | Rosenberg | 99/77.1 |
| 3,692,536 | 9/1972 | Fant | 99/171 P X |

Primary Examiner—Frank W. Lutter
Assistant Examiner—Steven L. Weinstein
Attorney, Agent, or Firm—Hofgren, Wegner, Allen, Stellman & McCord

[57] ABSTRACT

A method of making a precharged disposable coffee bag wherein the bag is made from porous, heat sealable paper or the like either from a single web formed into a tube or from two webs of such material wherein the bag is given one seal which is semiannular followed by partial filling of the resultant arcuate pocket with ground coffee and then completion of the bag as caused by a second sealing operation which makes a straight-line seal to form a semicircular bag.

1 Claim, 3 Drawing Figures

PATENTED NOV 5 1974
3,846,569
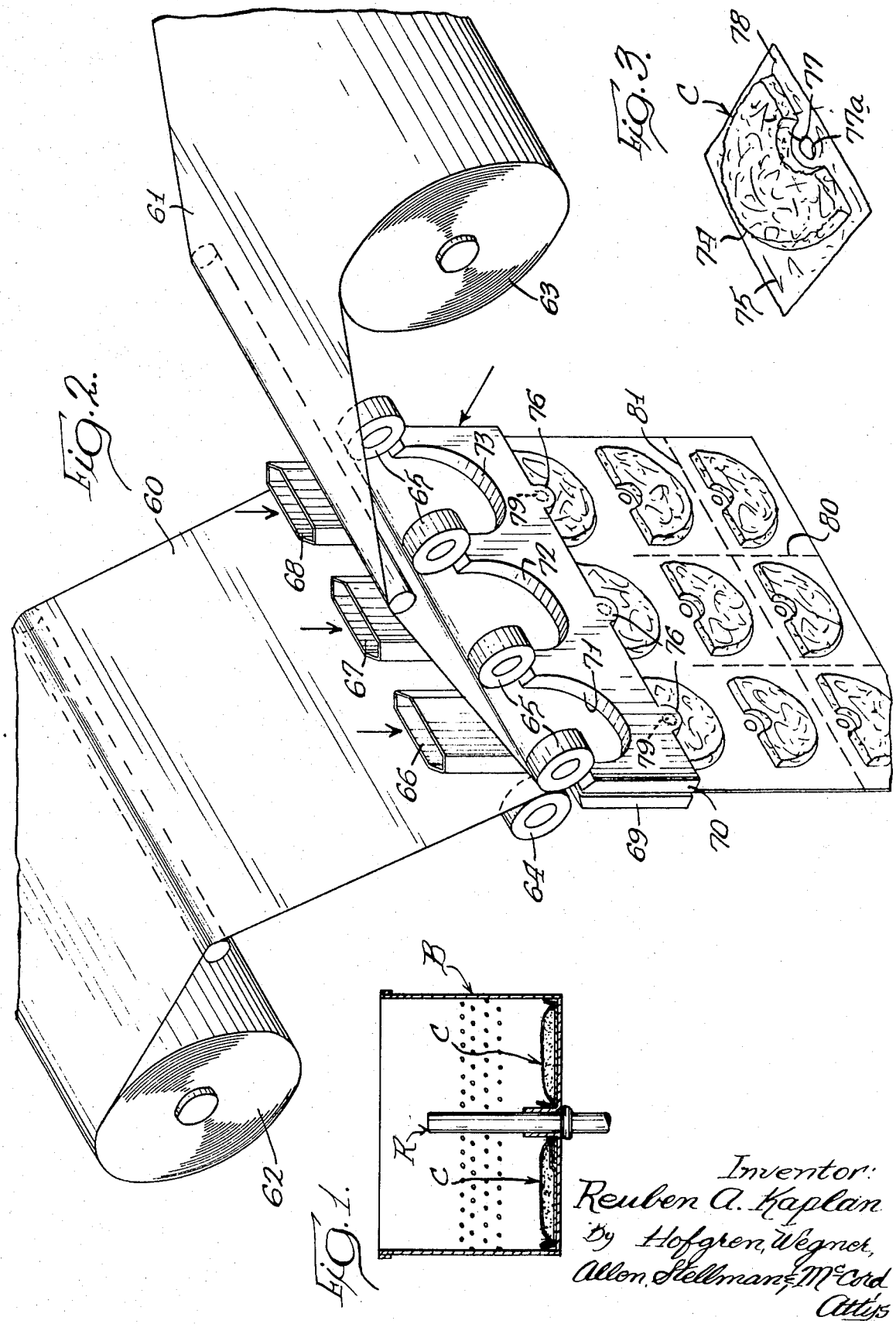

METHOD OF MAKING A DISPOSABLE PRECHARGED COFFEE BAG

CROSS-REFERENCE TO RELATED APPLICATIONS

This application comprises a continuation of my copending application Ser. No. 114,149, filed Feb. 10, 1971, now abandoned, which is a continuation of Ser. No. 881,053, filed Dec. 1, 1969, now abandoned.

BACKGROUND OF THE INVENTION

1. Field of the Invention

This invention pertains to methods of making disposable precharged coffee bags and the resulting product.

2. Description of the Prior Art

The state of the art known to applicant includes a commercially available product which, in effect, is a sheet of porous paper having a plurality of openings whereby when the paper is placed in the basket of a percolator and a coffee charge manually measured thereinto, the corners of the sheet are folded to define a packet which holds the coffee during brewing and, to some extent, facilitates removal of the spent coffee charge from the basket after brewing. Also known is a coffee bag construction, such as shown in Costas U.S. Pat. No. 3,420,675. This patent discloses a disposable coffee cartridge wherein a perforate sheet is used for the top and bottom elements of the cartridge and the outer periphery is defined by a series of straight-line connected sections which results in a fitting in the percolator basket, as shown in FIG. 4 of the patent, wherein the cartridge outer periphery does not closely fit the percolator basket and, therefore, does not insure the flow of water through the coffee during brewing. Additionally, this patent does not disclose any commercially feasible method for making the cartridge.

Substantial effort has been expended in the art to develop a porous annular precharged coffee bag which could be installed in the basket of the percolator about the upper end of the pump stem to extend effectively sealingly between the pump stem and the cylindrical sidewall of the basket to permit optimum brewing of coffee by the water pumped out of the top of the stem thereonto. It has, however, been found that improper filling of such annular bags often occurs with the known bagforming and filling apparatuses of the art so that such annular precharged coffee bag manufacture has not proven eminently successful. Special apparatus developed in an effort to produce such annular precharged bags has proven costly and has not been capable of producing consistently good results in the forming of annular precharged coffee bags. There is, to applicant's information and belief, no fully satisfactory annular precharged coffee bag product presently commercially available.

SUMMARY OF THE INVENTION

The present invention comprehends a unique solution to this vexatious problem by utilizing what may be termed a "half-bag" approach. Resultingly, the invention disclosed herein provides a commercially feasible method for making disposable coffee bags which bags can be placed in a percolator basket to insure that water passes through the coffee charge therein during brewing to provide clear filtered coffee without waste and which facilitate disposal of the used coffee grounds by simple removal of the bags from the basket. Additionally, the coffee bags disclosed herein can be used in an ordinary pot or pan to make boiled coffee without a messy cleanup job. The method comprehends forming segmentally annular coffee bags which may be used jointly to define a complete annular arrangement when desired, and which, by virtue of the small quantity of ground coffee provided in each segmentally annular bag, provides improved accuracy in the preparation of the desired quantity of brewed coffee.

Commercially feasible disposable coffee bags with premeasured charges of coffee must be manufactured at a reasonable cost in order to be marketable and, therefore, it is a primary object of this invention to provide a method of manufacture of such coffee bags from continuous lengths of porous heat sealable paper or the like and with the coffee bag being only partially filled and of a contour to closely fit the inside of the percolator basket.

It is, therefore, an object of this invention to provide a method of making disposable coffee bags with a premeasured bag of coffee wherein the bag is made from a continuous web of material which is formed into a tube, a first semiannular arcuate seal is made across the tube to form an arcuate pocket of the coffee bag, followed by insertion of a charge of coffee and a second seal is made across the tube with this second seal being a straight-line seal to form a completed semicircular charged bag.

A further object of the invention is to provide a method of making a plurality of disposable coffee bags with premeasured charges of coffee which are made as a continuous process from two webs of porous heat sealable paper or the like, or which could be made from a single web folded along the middle to, in effect, define two webs of paper, with a first heat sealing operation forming semiannular, arcuate seals to define a plurality of arcuate pockets, charging each of the pockets thus formed with a premeasured amount of coffee, and making a second seal to complete the charged coffee bag at the same time as a first arcuate seal is made for the succeeding series of bags.

A still further object of the invention is to provide new and improved disposable coffee bags as made by the methods defined in the preceding objects.

BRIEF DESCRIPTION OF THE DRAWING

Other features and advantages of the invention will be apparent from the following description taken in connection with the accompanying drawing wherein:

FIG. 1 is a fragmentary vertical section of a percolator basket and associated pump stem with a disposable arcuate coffee bag embodying the invention positioned therein;

FIG. 2 is a perspective view of a mechanism for performing the method embodying the invention of making such a disposable coffee bag; and FIG. 3 is a perspective view of the coffee bag.

DESCRIPTION OF THE PREFERRED EMBODIMENT

The method disclosed herein and the coffee bags made as a result thereof provide a disposable coffee bag having a premeasured charge of coffee which will fit into the basket of a percolator. This operation is shown generally in FIG. 1 wherein a pair of coffee bags, indicated generally at C, is fitted within a percolator basket, indicated generally at B, each bag having an opening fitting around the percolator riser, or pump stem, indicated generally at R. As the coffee is brewed, water flows downwardly through the coffee bags C and because of the close fitting of the coffee bags within the basket, it is not possible for water to avoid passage through the coffee within the bag. Upon completion of brewing, the coffee bags C can be simply removed from the basket to avoid a messy cleanup operation. Alternatively, the coffee bag can be used in a pot or pan to brew coffee and with simple throw-away of the bag upon completion of brewing.

The method of forming the coffee bag C is illustrated by the structure shown in FIG. 2 wherein a pair of webs of porous, heat-sealable paper 60 and 61 is supplied from supply rolls 62 and 63, respectively, which webs are brought together by a series of coacting small rollers 64 and 65 arranged in pairs which have resilient surfaces to cause the webs to conform to the shape of a series of coffee-charging chutes 66, 67, and 68. The charging chutes provide a means for introducing coffee to a desired location and also assist in forming the coffee bags from the two webs 60 and 61. There are many different papers suitable for this purpose and, as one example, a two-phase paper having a base phase of fibers and a second phase, which is an integral layer of thermoplastic fibers, can be used. An example of such material is paper grade 1234 offered by The Dexter Corporation of Windsor Locks, Connecticut.

A first sealing step is performed transversely of the webs 60 and 61 by a pair of heated sealing clamps 69 and 70, which have movement toward and away from each other into pressure engagement with the webs, said clamps also having up and down movement. Each of the clamps is of the same construction and, as shown for the clamp 70, there is a series of semicircular cutouts 71 and 72 and 73 which make a semiannular arcuate seal for each of the coffee bags, as indicated at 74 in FIG. 3, and with the remainder of the webs being sealed together as indicated at 75. The charges of ground coffee are then delivered to the transverse row of pockets and the clamps 69 and 70 then moved downwardly to draw the webs 60 and 61 downwardly. The clamps 69 and 70 are then moved apart and are elevated and again brought into engagement with the webs. The lower portion of each of the clamps 69 and 70 has a series of rounded extensions 76 which function to form the notch, or indentation, 77 in the coffee bag shown in FIG. 3, while, at the same time, the lower portions of the clamps 69 and 70 are forming a sealed band 78 across the width of the bag above the level of the coffee in the pocket. As shown in FIG. 3, indentation 77 effectively defines an extension of the sealed band 78 in the formed bag. These actions are occurring at the same time that the semiannular seal 74 is being made for the next transverse series of bags and the succeeding operation occurs similarly to that just described. The clamps 69 and 70 also have coacting punch elements, as indicated at 79, to make an opening 77a for the percolator stem R.

The equipment can also provide for longitudinal perforations 80 and transverse perforations 81 whereby individual bags can be severed for use as desired. The formation of the indentation 77 in the coffee bag shown in FIG. 3 is optional, as is the trimming of the excess heat-sealed paper shown beyond the sealed periphery of the coffee bag. Illustratively, the bag may be trimmed to have the edge adjacent indentation 77 intersect opening 77a whereby the opening may be segmentally circular opening away from said indentation. The coffee delivered to the bag is metered and the quantity is chosen to only partially fill the bag which simplifies the making of the bag and also makes it easier for the bag to adjust itself to some variations in the size of the percolator basket.

With there being a variation in diametric size of percolator baskets found on the market, it would be necessary to have a series of clamps 69 and 70 of different diametric sizes in order to make a series of bags of different diametric sizes to fit the full range of percolator baskets. Typical bag sizes would have diameters of 3, 3½ and 4 inches; however, some variation of coffee basket size can be accommodated easily by a loosely filled bag.

With the method disclosed herein, it is possible to make a disposable coffee bag with a premeasured charge of coffee on a production basis, with the shape of the bag being optimized whereby such disposable coffee bags can be priced reasonably to increase utilization thereof, with the desired results of providing clean, filtered coffee and with simple cleanup of the percolator after brewing.

The foregoing disclosure of specific embodiments is illustrative of the broad inventive concepts comprehended by the invention.

I claim:

1. The method of making a disposable semiannular precharged coffee bag of porous sealable paper or the like comprising, feeding a pair of web sections of said paper into face-to-face relation and at opposite sides of a downwardly-depending coffee charging chute, a first sealing step of sealing said pair of web sections together across their width including a semicircular concave sealing line to leave an upwardly-open pocket immediately beneath the discharge end of said chute with a filling opening the full width of the pocket, charging said pocket through the full width opening with a charge of ground coffee issuing from the discharge end of said chute to partially fill the pocket, sealing said web sections together along a generally straight line above the level of the coffee in said pocket to close off said pocket and form a sealed band of said web sections and at the same time perform said first sealing step for the next of said upwardly-open pockets, forming an extension of said sealed band extending into said pocket and forming a hole therein to fit the riser of a percolator with a portion of said band extending outwardly beyond said hole in order to overlap with another similar coffee bag, and moving said web sections a short distance to move the newly-formed pocket a distance to position the full width opening beneath the discharge end of said chute.

\* \* \* \* \*